(12) United States Patent
Suzuki

(10) Patent No.: US 12,498,742 B1
(45) Date of Patent: Dec. 16, 2025

(54) PRECISION GAS REGULATOR ADJUSTMENT MECHANISM UTILIZING STEPPER MOTOR CONTROL

(71) Applicant: Dexen Industries, Inc., Santa Fe Springs, CA (US)

(72) Inventor: George Suzuki, Santa Fe Springs, CA (US)

(73) Assignee: Dexen Industries, Inc., Santa Fe Springs, CA (US)

( * ) Notice: Subject to any disclaimer, the term of this patent is extended or adjusted under 35 U.S.C. 154(b) by 48 days.

(21) Appl. No.: 18/744,040

(22) Filed: Jun. 14, 2024

(51) Int. Cl.
G05D 16/20 (2006.01)
G05D 7/00 (2006.01)

(52) U.S. Cl.
CPC ........... G05D 16/202 (2013.01); G05D 7/005 (2013.01); *Y10T 137/7831* (2015.04)

(58) Field of Classification Search
CPC . G05D 16/202; G05D 7/005; Y10T 137/7831
USPC ............ 251/92, 93, 129.12, 288; 137/505.47
See application file for complete search history.

(56) References Cited

U.S. PATENT DOCUMENTS

| | | | | |
|---|---|---|---|---|
| 4,915,127 A * | 4/1990 | Werley | ............... | G05D 16/0663 137/71 |
| 5,680,880 A * | 10/1997 | Miyake | ................... | F02M 26/73 251/129.05 |
| 5,855,195 A * | 1/1999 | Oikawa | ................... | F02M 26/49 123/339.25 |
| 6,073,907 A * | 6/2000 | Schreiner, Jr. | ......... | F16K 31/043 251/291 |
| 6,224,034 B1 * | 5/2001 | Kato | ....................... | H02K 7/06 251/129.13 |
| 6,299,129 B1 * | 10/2001 | Suzuki | ................... | H02K 26/00 251/129.09 |
| 6,561,480 B1 * | 5/2003 | Komiya | ................ | F25B 41/347 251/129.05 |
| 7,143,993 B2 * | 12/2006 | Everingham | .......... | F02M 26/54 123/568.24 |
| 7,302,969 B2 * | 12/2007 | Hasegawa | ......... | H01M 8/04089 137/625.46 |
| 8,800,959 B2 * | 8/2014 | Hasunuma | ............ | F16K 41/103 251/129.04 |
| 8,851,448 B2 * | 10/2014 | Harada | ................... | F16K 31/53 251/85 |
| 11,799,348 B2 * | 10/2023 | Lee | ......................... | H02K 37/24 |
| 2023/0349651 A1 * | 11/2023 | Dueck | ...................... | F41A 5/28 |
| 2024/0102566 A1 * | 3/2024 | Rodgers | ............. | G05D 16/2086 |

* cited by examiner

*Primary Examiner* — William M Mccalister
(74) *Attorney, Agent, or Firm* — Mark Terry

(57) ABSTRACT

A precision gas regulator adjustment mechanism accurately controls the position of a plunger within a gas regulator. The mechanism includes a cylindrical adjust screw with external threads for securing it into a base atop the regulator's plunger, along with internal threads. A drive screw, threaded into the internal threads of the adjust screw, engages with the plunger upon insertion. A stepper motor paddle inserted into the drive screw's top slot enables rotation when the stepper motor is activated, thereby adjusting the drive screw's position within the adjust screw. Radial and vertical protrusions on the drive screw and adjust screw, respectively, limit rotation, ensuring precise adjustment. The mechanism offers a reliable and controlled means to manipulate gas flow regulation in various industrial applications.

17 Claims, 6 Drawing Sheets

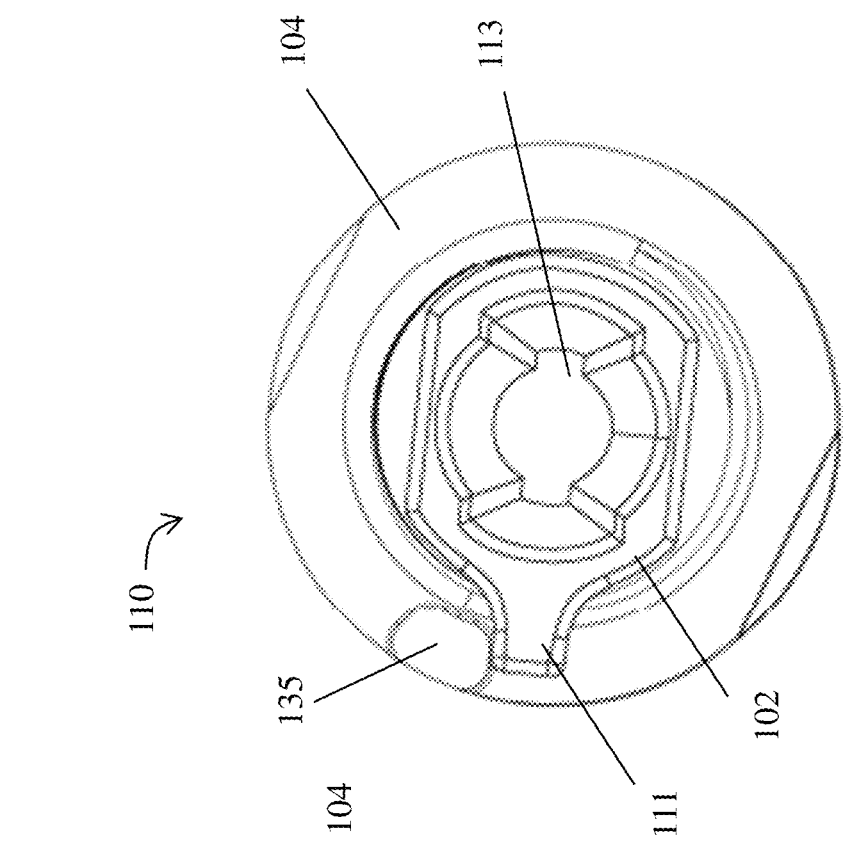
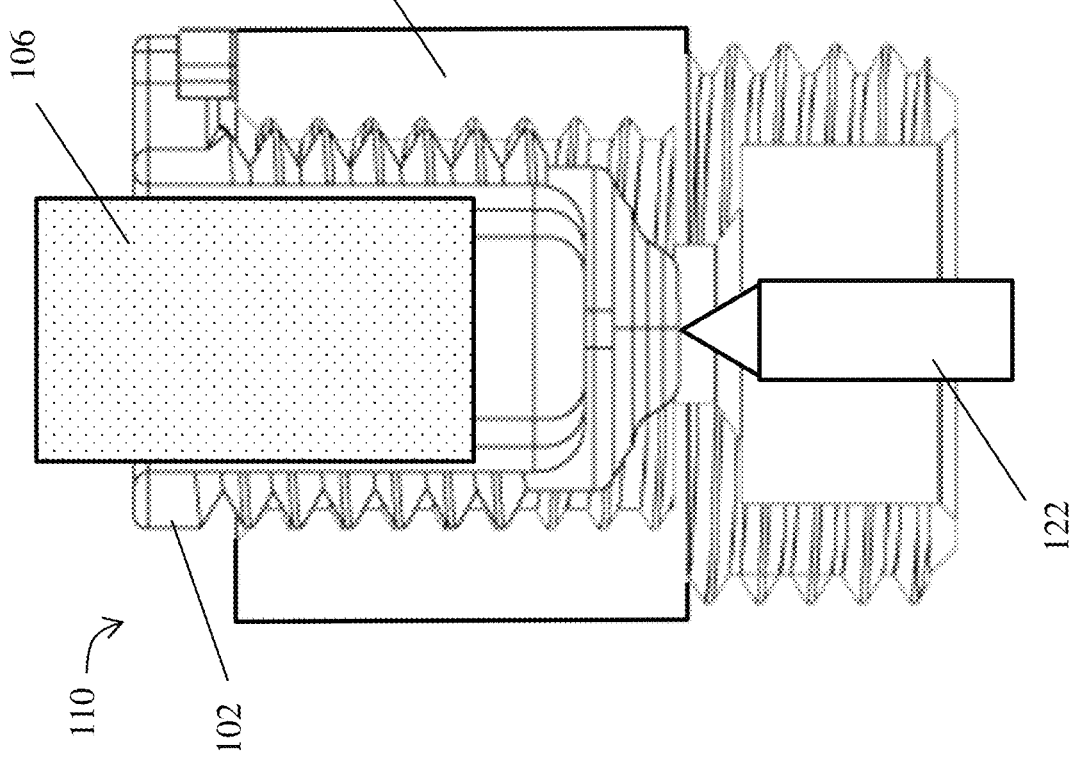
FIG. 5
FIG. 4

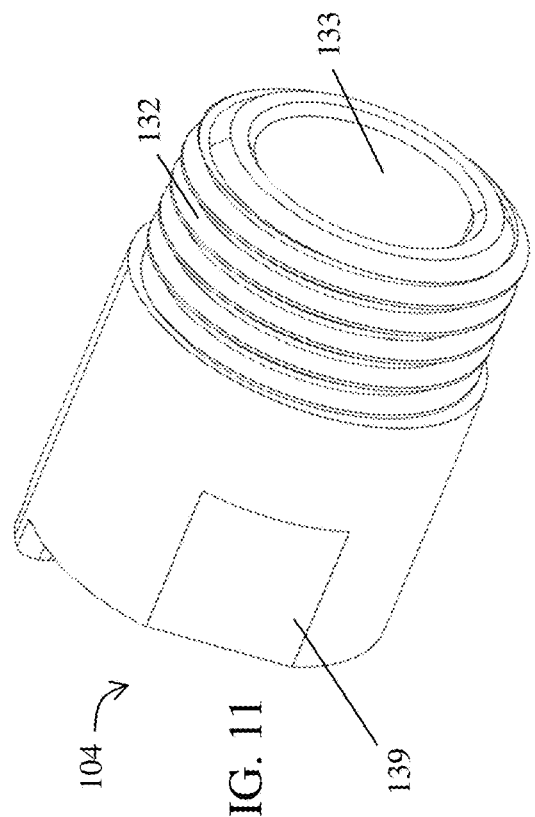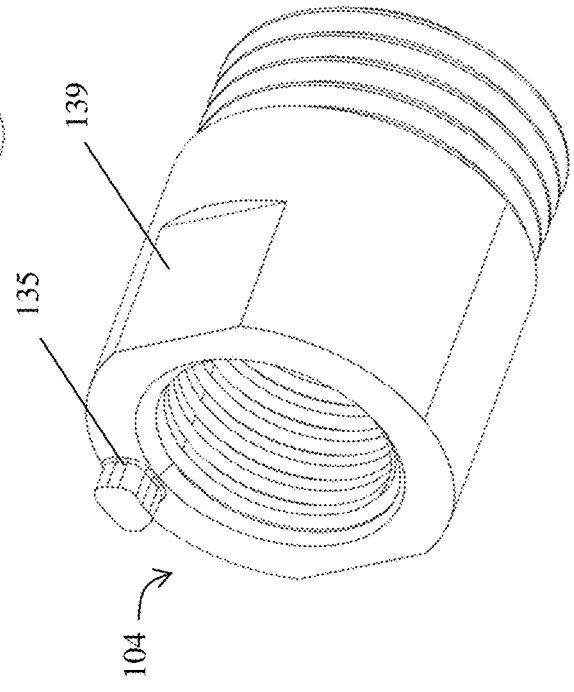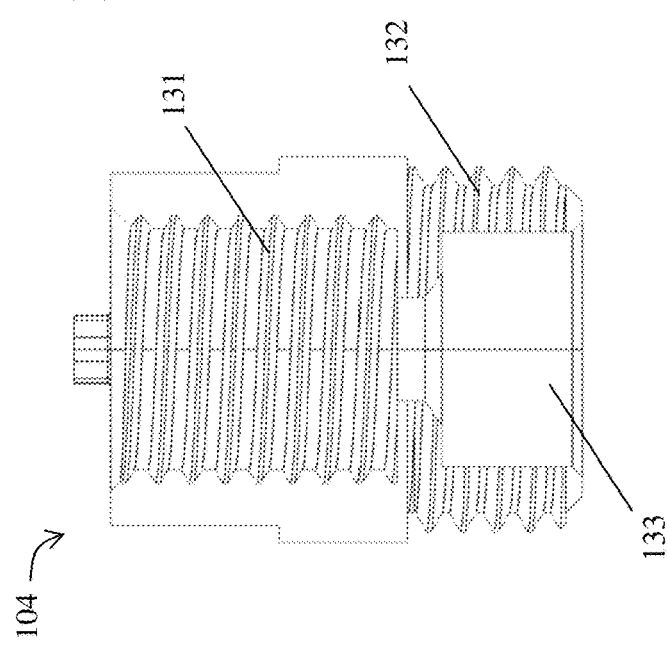

PRECISION GAS REGULATOR ADJUSTMENT MECHANISM UTILIZING STEPPER MOTOR CONTROL

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of gas regulators and, more particularly, for tools and apparatuses for adjusting gas regulators with precision and accuracy.

BACKGROUND

Gas regulators play a crucial role in numerous industrial processes, ensuring the safe and efficient control of gas flow rates. Traditional gas regulators typically employ mechanical means for adjustment, often involving manual manipulation of adjustment screws or knobs. While effective in many applications, these mechanisms can suffer from limitations in precision, repeatability, and ease of adjustment. Additionally, manual adjustment methods may not be suitable for environments where automation or remote control is desired.

Advancements in technology have led to the development of automated gas regulation systems, leveraging motorized components for precise control. However, existing automated gas regulator adjustment mechanisms may still face challenges. Some designs may lack sufficient precision, leading to inaccuracies in gas flow control. Others may be prone to mechanical wear and degradation over time, impacting long-term reliability. Moreover, certain designs may not adequately address the need for user-friendly operation or compatibility with existing gas regulator systems.

One common issue encountered with traditional gas regulator adjustment mechanisms, particularly those utilizing screws, is the phenomenon of friction locking when the adjustment screw bottoms out against its housing. This occurs when the screw is threaded fully into its housing, resulting in increased friction between the contacting surfaces. Friction locking can impede further rotation of the screw, preventing precise adjustment of the gas regulator. In some cases, this can lead to inaccuracies in gas flow control or difficulty in achieving desired settings. Moreover, attempts to force rotation past the friction-locked position may risk damaging the mechanism or compromising its integrity. Therefore, mitigating friction locking is paramount to ensuring the reliable and smooth operation of gas regulator adjustment mechanisms, especially in applications where precision control is essential.

In light of these challenges, there is a recognized need for an improved gas regulator adjustment mechanism that offers enhanced precision, reliability, and ease of use. Such a mechanism should be capable of seamlessly integrating with existing gas regulator systems while providing accurate and repeatable adjustments. Furthermore, it should offer the flexibility to accommodate various operational requirements, including automation and remote control capabilities. By addressing these needs, the proposed invention aims to advance the state of the art in gas regulator technology, offering a robust solution for a wide range of industrial applications.

BRIEF SUMMARY

In one embodiment, a precision gas regulator adjustment mechanism that accurately controls the position of a plunger within a gas regulator is disclosed. The mechanism includes a cylindrical adjust screw with external threads for securing it into a base atop the regulator's plunger, along with internal threads. A drive screw, threaded into the internal threads of the adjust screw, engages with the plunger upon insertion. A stepper motor paddle inserted into the drive screw's top slot enables rotation when the stepper motor is activated, thereby adjusting the drive screw's position within the adjust screw. Radial and vertical protrusions on the drive screw and adjust screw, respectively, limit rotation, ensuring precise adjustment. The mechanism offers a reliable and controlled means to manipulate gas flow regulation in various industrial applications.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

FIG. 4 is a cross-sectional side view of the claimed gas regulator adjustment mechanism in a full down position, in accordance with one embodiment.

FIG. 5 is a top perspective view of the claimed gas regulator adjustment mechanism, in accordance with one embodiment.

FIG. 10 is a side cross sectional view of the adjust screw of the claimed gas regulator adjustment mechanism, in accordance with one embodiment.

FIG. 11 is a bottom perspective view of the adjust screw of the claimed gas regulator adjustment mechanism, in accordance with one embodiment.

FIG. 12 is a top perspective view of the adjust screw of the claimed gas regulator adjustment mechanism, in accordance with one embodiment.

DETAILED DESCRIPTION

Figure 1:
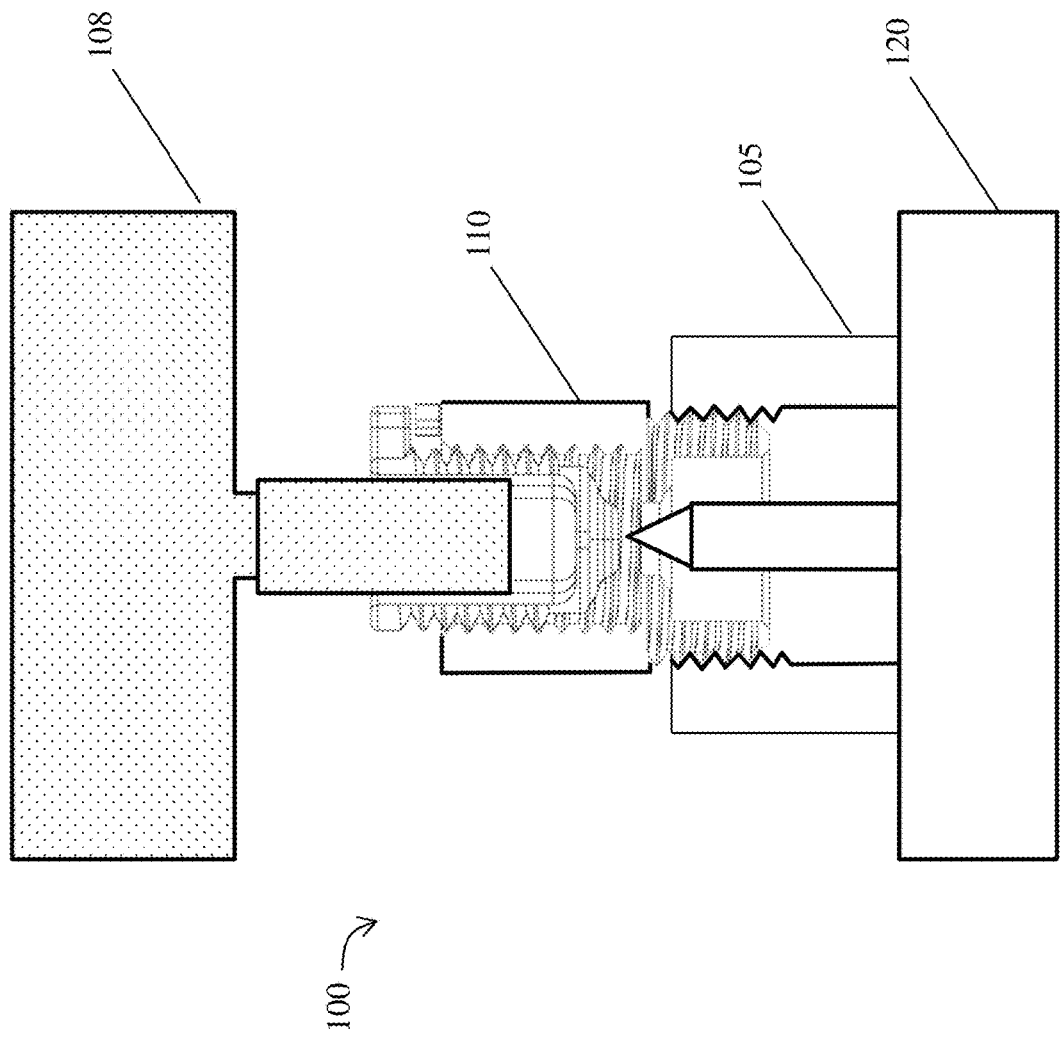
FIG. 1 is a cross sectional side view of a system using the claimed gas regulator adjustment mechanism, in accordance with one embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed device provides a precision gas regulator adjustment mechanism that offers significant advantages over traditional methods and systems, effectively addressing the limitations encountered with prior art solutions. One notable benefit of the claimed device lies in its enhanced precision and accuracy in controlling gas flow regulation. Unlike manual adjustment mechanisms, which may rely on imprecise screw-based systems, the claimed device incorporates motorized actuators and/or sensor feedback to ensure precise positioning of the adjustment rod or drive screw. This level of precision enables operators to achieve finely-tuned adjustments, minimizing the risk of over-correction or inaccuracies in gas flow control.

Moreover, the claimed device offers improved reliability and consistency in gas regulation operations. By employing closed-loop control systems, the claimed mechanism can continuously monitor and adjust the position of the adjustment rod or drive screw in response to changing operating conditions or user inputs. This capability not only enhances the stability of gas flow regulation but also reduces the need for manual intervention, thereby minimizing the potential for human error and ensuring consistent performance over time.

Another significant advantage of the claimed device is its versatility and compatibility with various gas regulator systems. Unlike fixed or proprietary adjustment mechanisms, the claimed device can be adapted to integrate seamlessly with existing gas regulator configurations. This flexibility allows operators to retrofit their systems with the precision adjustment mechanism, enhancing the functionality and performance of their gas regulation setups without the need for costly system overhauls or modifications.

Furthermore, the claimed device addresses the problem of friction locking encountered in some prior art solutions. By employing advanced design features such as low-friction materials, a rotation stopper mechanism, and precise control algorithms, the claimed device effectively mitigates the risk of friction locking, ensuring smooth and reliable operation even under challenging conditions. This not only enhances the user experience but also prolongs the lifespan of the mechanism by minimizing wear and tear on critical components.

Overall, the claimed precision gas regulator adjustment mechanism represents a significant advancement in gas regulation technology, offering improved precision, reliability, and compatibility compared to conventional methods. By addressing the shortcomings of prior art solutions and providing a robust, user-friendly alternative, the claimed device stands to revolutionize the way gas flow regulation is achieved in a wide range of industrial applications.

Referring now to the drawing figures in which like reference designators refer to like elements, the claimed device will now be described with reference to FIGS. 1-13.

FIG. 1 provides a cross-sectional side view of a system 100 utilizing the claimed gas regulator adjustment mechanism 110, where the mechanism is depicted in its operational environment atop a gas regulator 120. FIG. 1 shows the placement and integration of the mechanism 110 within a larger system 100, showing how mechanism 110 interfaces with the gas regulator 120 to control gas flow precisely. FIG. 1 shows that the claimed gas regulator adjustment mechanism 110 sits securely within a base 105 of the gas regulator 120 that is configured to accept the mechanism 110. FIG. 1 also shows that the claimed gas regulator adjustment mechanism 110 includes the stepper motor 108. A stepper motor, defined as an electromechanical device that converts electrical pulses into discrete mechanical movements, allows for the precise control of the mechanism's moving parts. A stepper motor, also known as a type of digital actuator, is an electrical motor that rotates in a series of small angular steps, instead of continuously. The stepper motor may have a variable step size (that is adjustable by the user), allowing for fine adjustment of the plunger position.

The gas regulator 120 is a device used to control and maintain the pressure of a gas supply, ensuring it is delivered at a consistent and safe level to downstream equipment or processes. The primary component is the inlet valve, where gas enters the regulator from the supply source, and a diaphragm, a flexible membrane, which responds to changes in downstream pressure and adjusts the valve position to maintain the desired output pressure. The diaphragm works in conjunction with a spring, which sets the desired output pressure and can be adjusted via a tension mechanism. The outlet valve is where the regulated gas exits the regulator and is delivered to the downstream equipment or application. An adjustment knob or screw allows a user to set or modify the desired output pressure by changing the tension on the spring.

The plunger 122 in the gas regulator adjustment mechanism is composed of a main body, and a sealing surface that ensures a tight seal to prevent gas leakage when the plunger is in the closed position. This sealing surface moves to allow gas flow when the plunger is adjusted. The plunger also includes a connection point for the drive screw. Additionally, guiding features such as grooves or ridges may be present to ensure smooth and aligned movement of the plunger within the regulator, preventing misalignment and ensuring consistent operation. A spring mechanism may be included to provide a return force, pushing the plunger back to its default position when the drive screw is retracted, thereby enhancing the responsiveness and accuracy of the adjustments. The plunger 122 in the precision gas regulator adjustment mechanism is a movable component within the gas regulator that directly controls the gas flow rate by adjusting its position in response to the rotation of the drive screw, which is precisely manipulated by the stepper motor paddle. By rotating the drive screw, the plunger can be moved up or down within the regulator. This precise movement is facilitated by the stepper motor paddle, which fits into a slot at the top of the drive screw. When the stepper motor is activated, it rotates the paddle, thereby rotating the drive screw. The rotation of the drive screw translates into linear motion, adjusting the plunger's position.

This setup allows for fine control over the plunger's position, enabling precise regulation of gas flow. The mechanism also includes features to prevent over-rotation, such as radial and vertical protrusions on the drive screw and adjust screw, respectively, which limit the extent of the drive screw's rotation. This design ensures that the plunger can be positioned accurately and reliably, enhancing the overall performance and precision of the gas regulator.

Figures 2, 3:
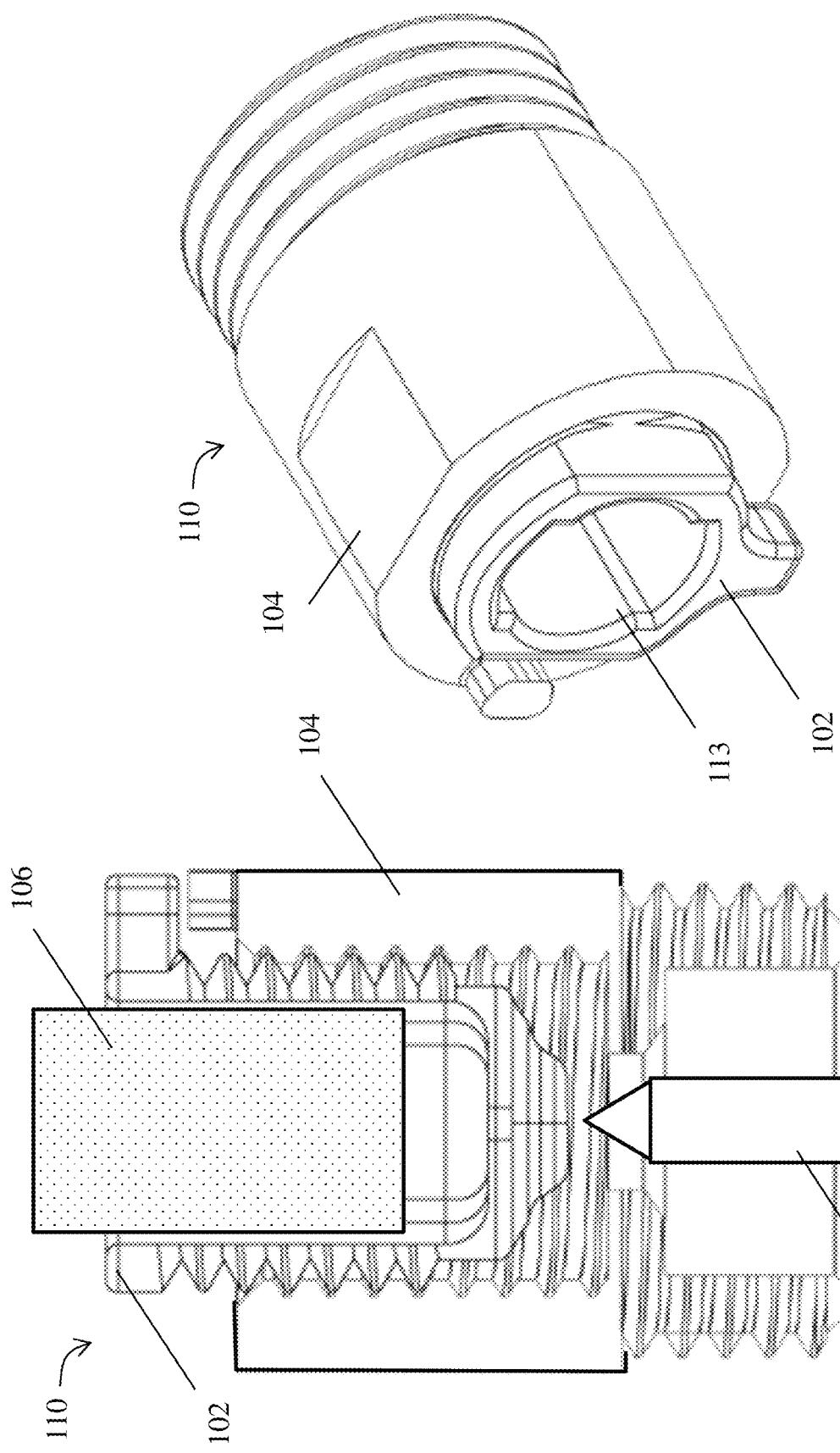
FIG. 2 is a cross sectional side view of the claimed gas regulator adjustment mechanism in a full up position, in accordance with one embodiment.
FIG. 3 is a top perspective view of the claimed gas regulator adjustment mechanism, in accordance with one embodiment.
Figure 6:
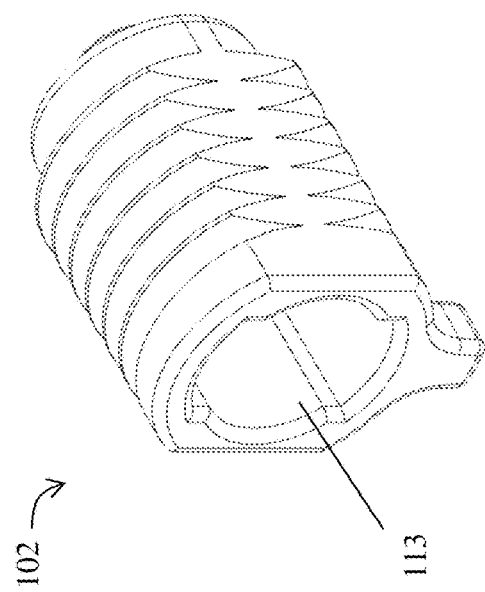
FIG. 6 is a side cross sectional view of the drive screw of the claimed gas regulator adjustment mechanism, in accordance with one embodiment.
Figure 7:
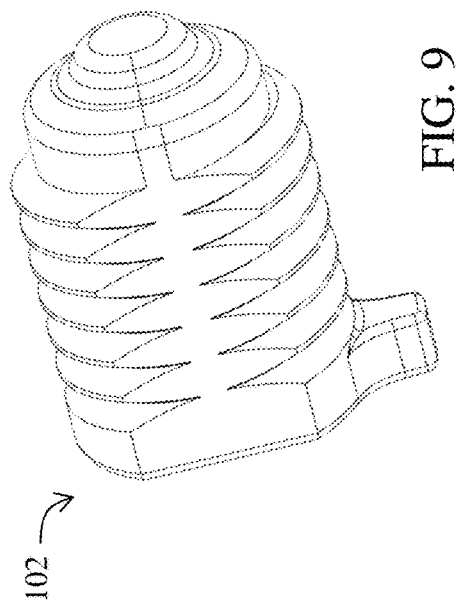
FIG. 7 is a top perspective view of the drive screw of the claimed gas regulator adjustment mechanism, in accordance with one embodiment.
Figure 8:
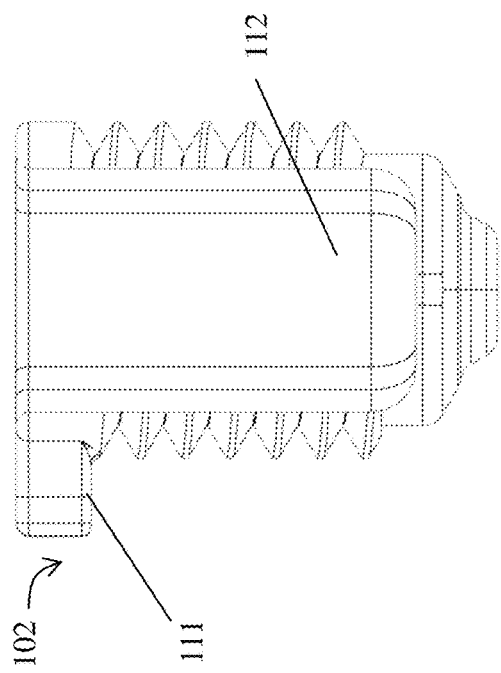
FIG. 8 is a side view of the drive screw of the claimed gas regulator adjustment mechanism, in accordance with one embodiment.
Figure 9:
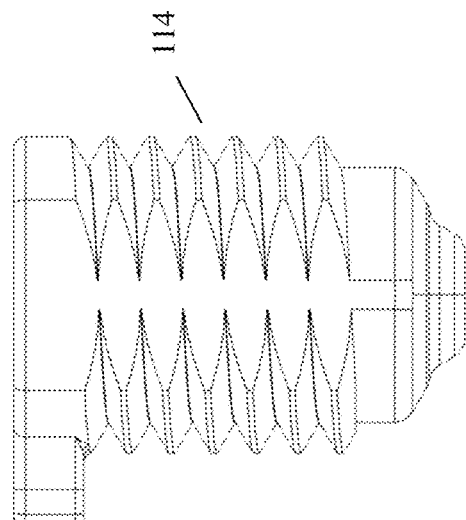
FIG. 9 is a bottom perspective view of the drive screw of the claimed gas regulator adjustment mechanism, in accordance with one embodiment.

FIG. 2 displays the gas regulator adjustment mechanism 110 in a full up position, highlighting how the drive screw 102 can move freely and rotatably within the adjust screw 104 (or cylindrical housing), which may be formed of brass. The full up position refers to the position of the drive screw 102 within the adjust screw 104, namely, that the drive screw is located in the topmost location possible within the adjust screw such that the drive screw does not contact the plunger 122. FIG. 2 illustrates the mechanism's capability to adjust the position of the plunger 122 within the regulator 120, which directly affects gas flow. The movable nature of the drive screw showcases its ability to provide precise control over gas flow rates. FIG. 2 also shows how the stepper motor paddle 106 interfaces with the drive screw 102 by contact the top of the drive screw.

The stepper motor paddle 106 interfaces with the drive screw and is designed to fit and rotate within the mechanism's cylindrical housing. The paddle has a central hub that connects to the stepper motor shaft, ensuring synchronized rotation. Extending from this hub would be the paddle, which is a blade or extension that engages with the drive screw. The blade is designed to fit within the drive screw, ensuring smooth and precise rotational movement.

In FIG. 3, a top perspective view of the mechanism 110 shows the drive screw 102 inserted into the adjust screw 104. FIG. 3 that the drive screw 102 includes a slot 113 on its top surface, the slot 113 configured to accept the stepper motor paddle 106. This illustrates how the motor's rotations result in the precise adjustment of the drive screw, which interfaces with the gas regulator's plunger 122.

FIG. 4 offers a cross-sectional side view of the mechanism 110 in a full down position, demonstrating the range of motion and adjustability of the drive screw 102 within the adjust screw 104. The full down position refers to the position of the drive screw 102 within the adjust screw 104, namely, that the drive screw is located in the bottom-most location possible within the adjust screw such that the drive screw contacts the plunger 122. FIG. 4 shows how the mechanism can fine-tune gas flow by adjusting the depth to which the plunger 122 is engaged within the regulator 120. FIG. 5, a top view, complements FIG. 3 by providing further detail on the mechanism's top assembly and its operational components. FIG. 5 shows how the stepper motor paddle 106 can be inserted into the slot 113 of the drive screw 102, translating rotational motion into linear displacement necessary for plunger adjustment.

The detailed depiction of the drive screw 102 in FIGS. 6 through 9 illustrates its design, including the radial protrusion 111 that limits rotation of the drive screw 102 within the adjust screw 104. The radial protrusion is a roughly cubical element that is located at a top surface of the drive screw, wherein the top surface of the radial protrusion is coplanar with the top surface of the drive screw, where the slot 113 is located. The radial protrusion prevents over-rotation of the drive screw. FIGS. 6-9 further show the exterior threads 114 of the drive screw, configured for threading into the interior of the adjust screw 104, as well as the slot 113 in the top of the drive screw, configured for detachable mating with the stepper motor paddle 106. FIGS. 6-9 also show the interior void 112 of the drive screw, which is shaped and sized to securely accept the stepper motor paddle 106.

The slot 113 may be shaped like a square, rectangle, trapezoid, circle, oval, etc. The slot 113 may further be keyhole shaped or have the shape shown in FIG. 7, which comprises largely a circular shape, wherein two opposing arcs of the circle have a greater diameter than the remaining portions of the circle.

The pitch of the threads of the drive screw may be specifically designed to facilitate fine adjustments of the plunger position. This deliberate configuration allows for granular control over the movement of the plunger, enabling operators to make precise modifications to gas flow with unparalleled accuracy. The thread pitch acts as a fine-tuning tool, translating rotational movements into exact, linear displacements of the plunger. This feature provides advanced level of control and reliability, ensuring that users can achieve the desired gas flow conditions with minimal effort and maximum precision. Also, the drive screw may be composed of a material with low friction characteristics for enhancing the performance of the precision gas regulator adjustment mechanism. This feature facilitates smoother, more effortless adjustments, ensuring that the act of modifying the plunger position is seamless and requires less force. Lower friction means reduced wear and tear on the threads of both the drive screw and the adjust screw, prolonging their operational life and maintaining the precision of adjustments over time.

FIGS. 10 through 12 depict the adjust screw 104 that interfaces with the gas regulator's plunger 122. The adjust screw has a largely cylindrical shape, featuring both external and internal threads that facilitates the secure attachment of the mechanism 110 to the regulator 120 and the precise movement of the drive screw 104, respectively. FIGS. 10 through 12 illustrates its design, including the vertical protrusion 135 that limits rotation of the drive screw within the adjust screw 104. The vertical protrusion is a roughly cylindrical element that is located at a top surface of the rim of the adjust screw, wherein the top surface of the vertical protrusion extends beyond the plane of the top surface of the adjust screw where the drive screw is inserted. The vertical protrusion prevents over-rotation of the drive screw that could lead to friction lock. FIGS. 10-12 further show the exterior threads 132 of the adjust screw, configured for threading into the interior of the base 105 of the gas regulator 120, as well as the interior threads 131, configured for interfacing with the exterior threads of the drive screw. FIGS. 10-12 also show the interior void 133 of the adjust screw, which accommodates the plunger 122. FIGS. 11 and 12 also show two opposing flat surfaces on the exterior surface of the adjust screw, which are used as placement for a wrench of other tool for turning or rotating the adjust screw when placing it on the base 105 of the gas regulator 120 that is configured to accept the mechanism 110.

A corrosion-resistant coating may be used on both the adjust screw and drive screw. This protective layer serves as a barrier against the detrimental effects of moisture, chemicals, and other corrosive elements that these components might encounter in various industrial environments. By safeguarding the adjust screw and drive screw against corrosion, the coating ensures that the mechanism maintains its precision and functionality over extended periods of use. This feature not only enhances the reliability of the gas regulator adjustment mechanism but also minimizes maintenance requirements, thereby reducing operational downtime and costs.

The interaction between the radial protrusion 111 of the drive screw 102 and the vertical protrusion 135 of the adjust screw 104 is described as follows. The radial protrusion 111, positioned on the top surface of the drive screw 102, plays a role in limiting the rotation of the drive screw within the adjust screw 104. This is crucial in preventing over-rotation that could lead to inaccuracies in gas flow control or potential damage to the mechanism. The radial protrusion, with its specific size and shape, is designed to engage with the vertical protrusion 135 when the drive screw is in the full down position (as shown in FIGS. 4 and 5), so as to prevent the further rotation of the drive screw. The vertical protrusion 135, located on the top surface of the adjust screw 104, provides a physical barrier to the drive screw that defines the limits of rotational movement. This interaction not only mitigates the risk of friction locking but also distributes the contact pressure evenly, which is essential for maintaining the integrity of the mechanism 110 over time.

The engagement between the two protrusions is shown in FIGS. 4 and 5. These figures show that in the full down position, the side surface of the radial protrusion 111 contacts the side surface of the vertical protrusion 135, thereby stopping the further rotation of the drive screw. The side surface of the radial protrusion 111 refers to the vertical planar surface of the side of the radial protrusion and the side surface of the vertical protrusion 135 refers to the vertical planar surface of the side of the vertical protrusion. The radial protrusion comprises a size and shape configured to evenly distribute contact pressure among the vertical protrusion. Likewise, the vertical protrusion comprises a size and shape configured to evenly distribute contact pressure among the radial protrusion.

Figure 13:
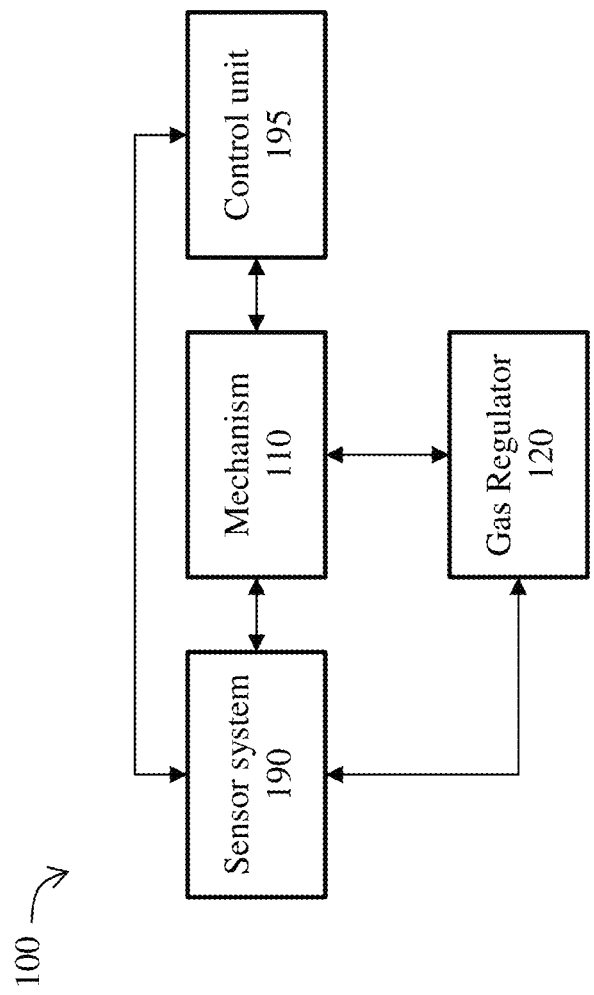
FIG. 13 is a block diagram of a system using the claimed gas regulator adjustment mechanism, in accordance with one embodiment.

FIG. 13 is a block diagram of a system 100 using the claimed gas regulator adjustment mechanism 110, in accordance with one embodiment. In one embodiment, the system 100 includes a sensor system 190 that introduces a feedback loop. The sensor system detects the position of the drive screw 102 and, by extension, the position of the plunger 122 of the gas regulator 120. By monitoring these positions, the mechanism 110 can use this information to adjust the drive screw (via the stepper motor) in real-time to maintain or achieve desired gas flow parameters, ensuring accuracy and consistency in gas regulation. The sensor system may include a position sensor for accurately determining the drive screw's position. This capability ensures that adjustments made by the mechanism 110 are both precise and reflective of the actual needs, enhancing the system's reliability and effectiveness.

The sensor system may include a pressure sensor designed to monitor gas pressure downstream of the gas regulator, wherein the pressure sensor provides real-time feedback on the gas pressure, enabling the control unit to make dynamic adjustments to the position of the drive screw, ensuring that the gas flow is consistently regulated to meet a predetermined setpoint. This automated feedback loop matches the pressure sensor with control unit programming, assisting in management and control of gas flow.

In one embodiment, the system 100 includes a control unit 195 that receives feedback from the sensor system 190. The control unit is programmed to analyze the feedback from the sensor system 190 and control the motorized actuator or stepper motor 108 accordingly. The control unit orchestrates the operation of the mechanism 110, directing the motorized actuator to adjust the drive screw's position based on predetermined parameters or user inputs. The ability to adjust based on feedback allows for precise, dynamic control of gas flow. The control unit may also implement proportional-integral-derivative (PID) control algorithms. This advanced control strategy allows for more nuanced adjustments to the gas flow, taking into account the rate of change and the historical error in the system's output. PID control minimizes overshoot and ensures stability in the regulation process. Through the integration of mechanical adjustments, electronic control, and real-time feedback, the precision gas regulator adjustment mechanism 110 represents a significant advancement in gas regulation technology.

A proportional-integral-derivative algorithm is a control loop employing feedback that is widely used in industrial control systems and a variety of other applications requiring continuously modulated control. A PID algorithm continuously calculates an error value as the difference between a desired setpoint (SP) and a measured process variable (PV) and applies a correction based on proportional, integral, and derivative terms. A PID algorithm automatically applies accurate and responsive correction to a control function. A PID algorithm has the ability to use the three control terms of proportional, integral and derivative influence on controller output to apply accurate and optimal control. The PID algorithm may be implemented as computer software in a distributed control system, programmable logic controller (PLC), or a discrete compact controller.

The control unit may be capable of storing and recalling multiple preset configurations that allows operators to quickly switch between different operating conditions or gas flow requirements with the push of a button, optimizing efficiency and productivity. By enabling the pre-setting of configurations tailored to specific tasks, the control unit reduces setup times and eliminates the need for manual recalibrations, thereby enhancing operational continuity. This capability is beneficial in environments where gas flow needs vary frequently or where precision is paramount.

The control unit 195 may be a computing device that includes a processor, a memory, such as RAM, and data storage, such as a hard drive. The control unit 195 may be a commercially available workstation computer, server, laptop computer, desktop computer, tablet computer, or the like. The control unit 195 may also be a programmable logic controller, which is an industrial computer that has been ruggedized and adapted for the control of certain processes that require high reliability, ease of programming, and process fault diagnosis. The control unit 195 may also be a system on a chip.

While certain embodiments have been described, other embodiments may exist. Furthermore, although embodiments herein have been described as being associated with food-like substances, the claimed embodiments may be used with substances used in other fields such as industrial, manufacturing, automotive, marine, medical or the like.

Further, the disclosed components may be modified in any manner, including by reordering components and/or inserting or deleting components, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A precision gas regulator adjustment mechanism, comprising:
    a cylindrical adjust screw having external threads configured for threading into a base positioned atop a plunger of a gas regulator, said adjust screw further comprising internal threads;
    a drive screw configured for threading into the internal threads of the adjust screw, said drive screw contacting the plunger when threaded into the adjust screw;
    a stepper motor paddle inserted into a slot at the top of the drive screw, wherein activation of the stepper motor causes rotation of the stepper motor paddle, thereby rotating the drive screw within the adjust screw;
    a radial protrusion on a top surface of the drive screw, and a vertical protrusion on a top surface of the adjust screw, said radial protrusion and vertical protrusion configured to limit rotation of the drive screw within the adjust screw; and
    whereby rotation of the stepper motor paddle adjusts a position of the drive screw within the adjust screw, thereby adjusting a position of the plunger of the gas regulator.

2. The precision gas regulator adjustment mechanism of claim 1, wherein the threads of the drive screw have a pitch configured to provide fine adjustment of the plunger position.

3. The precision gas regulator adjustment mechanism of claim 1, wherein the drive screw comprises a material with low friction characteristics to minimize resistance during adjustment.

4. The precision gas regulator adjustment mechanism of claim 1, further comprising a control unit configured to regulate activation of the stepper motor based on predetermined parameters or user input.

5. The precision gas regulator adjustment mechanism of claim 1, wherein the stepper motor paddle is detachably coupled to the drive screw.

6. The precision gas regulator adjustment mechanism of claim 1, wherein the radial protrusion on the top surface of the drive screw comprises a size and shape configured to evenly distribute contact pressure among the vertical protrusion of the adjust screw.

7. The precision gas regulator adjustment mechanism of claim 1, wherein the vertical protrusion on the top surface of the adjust screw comprises a size and shape configured to evenly distribute contact pressure among the radial protrusion of the drive screw.

8. The precision gas regulator adjustment mechanism of claim 1, further comprising a feedback sensor configured to detect the position of the plunger and provide feedback to a control system for closed-loop control of gas flow regulation.

9. The precision gas regulator adjustment mechanism of claim 1, wherein the adjust screw and drive screw are coated with a corrosion-resistant material.

10. The precision gas regulator adjustment mechanism of claim 1, wherein the stepper motor has a variable step size, allowing for fine adjustment of the plunger position.

11. A precision gas regulator adjustment mechanism comprising:
    a cylindrical housing configured for attachment to a gas regulator;
    a threaded drive screw rotatably mounted within the housing;
    a radial protrusion on a top surface of the drive screw, and a vertical protrusion on a top surface of the cylindrical housing, said radial protrusion and vertical protrusion configured to limit rotation of the drive screw within the cylindrical housing;
    a motorized actuator connected to the drive screw for rotation thereof;
    a sensor system configured to detect the position of the drive screw;
    a control unit programmed to receive feedback from the sensor system and control the motorized actuator to adjust the position of the drive screw based on predetermined parameters or user input; and
    wherein the drive screw is adapted to engage with a plunger of the gas regulator to control gas flow regulation.

12. The precision gas regulator adjustment mechanism of claim 11, wherein the motorized actuator is a stepper motor configured for incremental rotation of the drive screw.

13. The precision gas regulator adjustment mechanism of claim 11, wherein the sensor system comprises a position sensor for accurately determining the position of the drive screw.

14. The precision gas regulator adjustment mechanism of claim 11, wherein the control unit is configured to implement proportional-integral-derivative (PID) control algorithms to optimize gas flow regulation.

15. The precision gas regulator adjustment mechanism of claim 11, wherein the control unit is programmable to store and recall multiple preset configurations for different operating conditions or gas flow requirements.

16. The precision gas regulator adjustment mechanism of claim 11, wherein the drive screw is coated with a low-friction material to minimize resistance and wear during operation.

17. The precision gas regulator adjustment mechanism of claim 11, wherein the sensor system comprises a pressure sensor configured to detect gas pressure downstream of the gas regulator, and wherein the control unit is further programmed to adjust the position of the drive screw based on the detected gas pressure to maintain a predetermined setpoint.

* * * * *